United States Patent [19]

Baus

[11] Patent Number: 4,569,092
[45] Date of Patent: Feb. 11, 1986

[54] SHOWER ENCLOSURE WITH MULTI-PLY SHEETS AND SECTIONAL RAILS

[76] Inventor: Heinz G. Baus, Wartbodenstrasse 35, CH-3626 Hunibach-Thun, Switzerland

[21] Appl. No.: 539,738

[22] Filed: Oct. 6, 1983

Related U.S. Application Data

[63] Continuation-in-part of Ser. No. 57,336, Mar. 11, 1983.

[30] Foreign Application Priority Data

Mar. 16, 1981 [DE] Fed. Rep. of Germany ....... 3110157
Mar. 22, 1983 [DE] Fed. Rep. of Germany ....... 3310225

[51] Int. Cl.⁴ ............................................... A47K 3/22
[52] U.S. Cl. ........................................... 4/596; 4/599; 4/600; 4/612; 4/614; 49/501
[58] Field of Search ................. 4/608, 607, 596, 597, 4/599, 600, 612, 613–614, 663, 664; 49/501

[56] References Cited

U.S. PATENT DOCUMENTS

| | | | |
|---|---|---|---|
| 2,962,405 | 11/1960 | Morthland | 4/612 X |
| 3,230,549 | 1/1966 | McMurtrie et al. | 4/663 |
| 3,377,748 | 4/1968 | Kellerhals | 49/501 |
| 3,530,618 | 9/1970 | Grossman | 49/501 |
| 3,940,806 | 3/1976 | Mustee | 4/600 X |
| 3,949,526 | 4/1976 | Sherlock et al. | 49/501 |

Primary Examiner—Henry K. Artis
Attorney, Agent, or Firm—McGlew and Tuttle

[57] ABSTRACT

An enclosure, in particular for a bath or shower, comprises a frame formed of a plurality of sectional rails connected together and at least one door or wall element connected to the frame. The door or wall element includes a panel which is made up of two outer rails and an inner rail connected and sandwiched between the outer rails. At least one of the outer rails is made of transparent plastics material. Each rail has an outer exposed surface and a guide groove communicating with that surface and having a recess extending at least partly behind the outer surface. An elastic connecting strip is positioned within the groove and has a projecting portion extending into the recess for retaining the strip. The strip includes resilient engaging elements. A facing strip is engaged over the guide groove and has a projection projecting into engagement with the engaging elements of the connecting strip for holding the facing strip into the groove.

13 Claims, 9 Drawing Figures

SHOWER ENCLOSURE WITH MULTI-PLY SHEETS AND SECTIONAL RAILS

This is a continuation-in-part of co-pending parent application Ser. No. 057,336 filed Mar. 11, 1983.

FIELD AND BACKGROUND OF THE INVENTION

The present invention relates to a partition for forming a shower enclosure which includes multi-ply sheets of extrudable plastics material and sectional rails that form a frame. The plastics material of the multi-ply sheets are supplied by way of at least two webs which are produced by extruders having flat sheet dies and which are joined, together with a structured web, by means of rolls.

The sectional rail of the invention, which is particularly for a shower enclosure, comprises a recessed guide groove which is provided in an outer surface that is exposed to sight, and a facing strip which is received, by means of an elastic connecting strip in the guide groove, with the connecting strip engaging a recess of the sectional rail by a laterally protruding portion.

U.S. Pat. No. 4,098,943 to Degginger, et al discloses a process for manufacturing multi-ply sheets involving two webs of plastics material supplied by two extruders. A polishing stack is downstream of each extruder for polishing the webs which then are fed to a further set of rolls. A third extruder supplies a thermoplastic sheet which is fed, together with a long glass mat supplied from rolls, to the same set of laminating rolls. When entering thereinto, the thermoplastic sheet has a temperature above the fusion point of the plastics material so that the glass mat may become encased in the thermoplastic material. The two webs, initially, are to be joined in the process, although they are chilled to a large extent after having passed the polishing stack which is arranged at a relatively large distance from the set of rolls downstream of which smoothing rolls are arranged. From the webs thus assembled, the multi-ply sheets are cut to desired dimensions by means of suitable tools.

It will be seen that there are circumstances involved in performing this method which require comparatively large expenditures, the moreso since an additional extruder is necessary for embedding the glass mat or any type of structured web in the multi-ply sheets being produced. Moreover, a smoothing or polishing stack is arranged downstream of each of the two other extruders. Further problems arise with respect to control and, in particular, to synchronizing the operating of the various units such as the set of rolls, two polishing stacks and three extruders.

A sectional rail of the mentioned kind for a shower enclosure is disclosed in German Utility Model No. 80 13 940. The outer surface of the rail which is exposed to sight, is provided with a guide groove in which a facing strip of metal, plastic, wood, or the like, is inserted. The guide groove has recesses in its side walls, intended to retain the facing strip by means of an elastic connecting strip. The prior art connecting strip and the facing strip have a relatively large total height in the direction perpendicular to the outer surface of the sectional rail, so that the space available within the sectional rail is correspondingly reduced, or the overall dimensions and volume of the sectional rail must be correspondingly increased. This results in considerable expenditures on material, with not only the costs, but also the weight of the material being correspondingly high. Further, the prior art sectional rail hardly permits a firm retention of the facing strip, since due to the manufacturing tolerances, there may be play between the section rail, the connecting strip and the facing strip, and thus only a a relatively loose seat of the facing strip in the facing sectional rails may be achieved. Dirt and other matter may deposit between the facing strip and the sectional rail, which is undesirable for sanitary reasons, especially in shower enclosures.

SUMMARY OF THE INVENTION

It is an object of the present invention to provide an improved shower enclosure having a rail frame and multi-ply sheets of extrudable plastics material, which sheets are to comprise a predetermined pattern.

It is another object of the invention to create a manufacturing method and device for such multi-ply sheets involving a minimum of expenditures and enabling the use of non sophisticated machinery, preferably of conventional type.

In a method of the type stated initially hereinabove, the invention provides the improvement wherein the webs are fed to a single common set of rolls and wherein the flat sheet die of at least one extruder is so close to the set of rolls that a reliable permanent bond to the structured web and/or to the other web, is obtained owing to the heat accumulated and carried in the one web just extruded.

This method permits a simple and reliable way of manufacturing multi-ply sheets without sophisticated machinery. Surprisingly, it was found that a single common set of rolls replacing several sets of rolls, polishing stacks, etc., can be employed to achieve permanently durable bonding of the webs including the structured webs. For this purpose, it is important that the one web accumulates and carries enough heat for the enabling and the bonding thereof to the structured web and also to the other web. Therefore, a third extruder for encasing the structured web is dispensed with as the latter is directly bonded to the associated surface of the one web. Since the residual heat prevailing in the one web just extruded is utilized in the manner described, there is no need for additional heating equipment or even for a third extruder so that major economies of energy consumption are achieved.

An important advance of the invention is due to the fact that the webs as well as the structured web are joined by a single process and that expensive steps such as the application of a pattern or a structured web onto a preformed base web need not be carried out. Thus, the invention provides a particularly simple manner of manufacturing multi-ply sheets, using substantially conventional machines or units and plants. Furthermore, the multi-ply sheet thus produced comprises an inner pattern or structure that is protected against ambient effects or influences such as moisture, abrasion, dirt, etc. The central ply, i.e., the structured web, preferably comprises textile materials such as curtain cloth, print cloth or other fabrics. Colored or printed plastic foil can also be introduced as a structured web between the two webs supplied by the extruders and can be sandwich-bonded therebetween in accordance with the invention.

The method of the invention further permits introducing between the two outer webs a structured web that is produced by printing a pattern on the inside of the web supplied by the extruder. Likewise, there is no problem in providing such a pattern or structure on the inside surface of at least one of the two webs; in particular, by means of embossed rolls. It is also within the scope of the invention to introduce a plurality of such structured webs between the two outer webs so as to manufacture a sheet comprising more than three plies. Whichever embodiment is used, the insertion or application of the pattern onto the one relatively warm web is free from technological or processing difficulties, and further processing of the assembled webs including the sandwiched web can be done in a conventional manner to manufacture the multi-ply sheets. Due to the heat contained in the one web, the pattern is impressed onto the surface of this web and is thus fixed thereto. When the sheets are cut to desired dimensions for practical use, the trim lines, or edges, thus created remain sealed so that the pattern is guarded against ambient conditions, especially against moisture and dirt.

Reference is made to the fact that it is also possible to join the structured web between the two outer webs by spotfusing, depending on the nature of the surface of the pattern inserted or the structured web. Moreover, it is emphasized that the webs mentioned may also be supplied by other means associated to the extruders, be it additionally or alternatively, such as calenders, roll stacks or other arrays of rolls. Preferably, the webs have different temperatures when entering the roll nips of the set of rolls and/or when mutual bonding takes place. If both webs enter the set of rolls together simultaneously with the structured web, the difference of temperatures will safeguard that in the multi-ply sheet the structure or pattern is properly oriented and that no displacements, plaits, wrinkles, quills, pinches, etc., of the pattern can occur within the sheet. Actually, the web of lower temperature serves to fix and orient the structured web so that its pattern cannot penetrate in an irregular way into the other web which is softer due to its higher temperature. Prefixing of the structured web onto the one web is also warranted in case the two webs are inserted at different locations, i.e., in different roll nips of the set of rolls. For example, if the structured web is introduced into a first roll nip together with the one web, the latter will warrant proper orientation and fixing of the pattern on the path to the next roll nip where the other web is introduced. This mode of processing considerably facilitates the start-up and the adjustment of the set of rolls and of further installations. In addition, the reject rate is substantially reduced and productivity is enhanced accordingly.

In a preferred embodiment of the method, the entering temperature of at least one web is within a predetermined range above the fusing temperature of the plastics material, preferably by up to 100° C., advantageously by 50° C. and especially by up to 20° C. Thereby, bonding of the structured one web is reliably brought about and overly deep penetration of the structured web into the one web is prevented. Experience has proven that the rolling process can well be performed in the temperature range stated so as to obtain multi-ply sheets of absolutely flawless surface finish.

In a particular mode of the method according to the invention, the webs and the structured web are fed to a single laminator. If required, the webs and the structured web may be introduced together into the same nip between two rolls or they may be fed independently of each other into different roll nips of the laminator. It will be evident that by comparison to the method according to U.S. Pat. No. 4,098,943, considerable economy is achieved regarding capital expense and also in respect of factory cost. In addition, the process is distinguished by a high operational reliability and by the ease of operation of a single laminator.

Preferably, at least one web is of light transmitting or transparent plastics material which presents no problem in processing but which renders the pattern inserted visible. For instance, if the structured web is a curtain cloth bearing a pattern, the multi-ply sheet thus manufactured will offer to any person viewing it an appearance resembling a curtain. However, as the curtain cloth is within the sheet, no soiling or deterioration will take place even during a long service life.

Advantageously, the structured web is fed as a preformed web and is sandwiched between the plastics webs. This mode serves to adapt, in a particularly simple way, both the texture and the appearance of the pattern to specific requirements. As desired, different preformed webs may be fed so that it is not necessary to make special adjustments or other modifications at the extruders or at their flat sheet dies.

Preferably, the structured web is first joined to the inner surface of the one web whereupon the other web is fed subsequently. Thus, the structured web will always be properly oriented relative to the one web. Therefore, even very thin structured webs may be applied, e.g., extremely thin color plies.

In particular, at least one web having left the flat sheet die is passed over at least one roll such that the structured web is bonded to the inside surface of the one web by this process. Advantageously, the roll of a printing unit may be used to apply a color coating or a plurality of color coatings to the inside surface of the web. Alternatively, a roll having an embossed circumference may be employed for impressing or engraving a given pattern onto the web's inside surface. The invention further provides for applying in addition, a color coating onto the embossed inside surface so that the double effect of an embossed and dyed pattern is achieved in a very simple way.

According to another embodiment of the invention, visual structures, in particular by way of small preformed particles, of figuline grains and/or of dye substances, are sandwiched between the webs and are subsequently at least partially rolled thereinto and/or are bonded thereto by means of the laminator. For instance, small transparent and/or colored balls or rods may be spread between the webs or onto one web and may be forced into this matrix by means of the laminator. Alternatively, dye substances may be sprayed in between the webs or may be applied onto the inside of the one web. Whichever mode is selected, the various patterns can be inserted or applied with very little effort to obtain the desired appearance of the multi-ply sheet thus manufactured.

In particular, the webs are fed together to the laminator whose rolls have substantially smooth surfaces. Consequently, the multi-ply sheets produced thereby have a smooth finish on their outer surfaces, whereas certain patterns are provided inside. Therefore, the handling of such sheets is made much easier. In particular, the smooth outer surfaces permit easy cleaning of the sheets.

Preferably, the one web is fed to a laminator having at least one roll with an embossed surface and thereafter the other web, having passed the laminator, is joined to the surface of the one web structured by the embossed roll. In this simple manner, a desired pattern is impressed onto the one web and is encased inside the webs when these are bonded. However, such a multi-ply sheet has the look of a panel or sheet with a structured or embossed outside surface, although both outer faces are essentially smooth.

Expediently, at least the one web with the structured surface is chilled when being joined to the other web such that substantially no change will occur in the structured surface. In fact, it is difficult or impossible conventionally to retain control on the bonding process such that the pattern introduced will not undergo more or less irregular modifications, whereas these are efficiently prevented by the method of the invention.

According to a further embodiment thereof, an adhesive is introduced between the webs for joining them under the subsequent action of a laminator or of a set of rolls. Thus, a reliable bonding of the webs is attained without sophisticated machinery, since it is possible, by adjusting the roll clearance of the laminator or of the set of rolls, to select and govern in an ideal way the thickness of the adhesive layer. Although the adhesive may be substantially colorless, it is preferred to add suitable dye substances to the adhesive as desired in order to obtain, in a particularly advantageous manner, color effects and optical functions of the multi-ply sheet thus produced.

A particularly favorable way of producing the sheets of the present invention, provides that at least one web holds heat during the joining process to such extent that a reliable permanent bond to the structured web and/or to the other web is achieved. It will be remembered that webs as supplied by extruders are at a high temperature level so that the materials employed are in their plastic state and thus lend themselves to shaping with the property of adhering or sticking to other articles. This effect is exploited by the invention which provides measures to warrant that at least one of the webs will carry sufficient heat during the bonding process, which measures can be realized without difficulty.

A further advance over the prior art is attained if for joining the webs, a structured web is introduced whose fusion point is lower than that of the plastics material of the webs, the structured web itself being preferably heated by the heat accumulated and carried in the webs during extruding, whereby permanent bonding of the assembled webs is achieved. Thus, the structured web which, if so desired, may also contain dye substances acts, in fact, as an adhesive.

Yet, another mode of practicing the invention provides that color patterns be applied on at least one outer surface of the web or of the sheet when the laminator has been passed, which color patterns are subsequently partly removed again, especially by polishing, paring, or the like.

In a device of the type mentioned initially hereinabove, the invention further provides the improvement wherein the flat sheet dies are arranged substantially parallel to each other at such spacing therebetween and to a set of rolls that on one hand there is room for feeding the structured web between the webs and that these will, on the other hand, be chilled but moderately. It will be seen that owing to the parallel arrangement of the flat sheet dies, the invention avoids problems of control and operation command regarding the discharging rate of the extruders, the working speed of the laminator, the stripping or winding speed as well as the thickness of the multi-ply sheets thus produced. Moreover, the flat sheet dies are spaced to each other and to the laminator such that the structured web may easily be fed between the two plastic webs. However, in order that the assembled webs be properly bonded, the spacing is selected to be short enough for preventing an overchilling of the webs when they have passed the flat sheet dies.

Further, in accordance with the invention, take-off means are provided for a preformed web or a structured web which is fed between the extruders and flat sheet dies to a laminator, preferably by means of a feeder. Such take-off means may simply comprise a roll for the preformed web or the structured web and, if need be, driving motors or elements may be provided in order to effect the synchronous feeding of the webs and the structured web to the laminator. Alternatively, a separate feeder; e.g., a pair of rolls, may be provided for simultaneous feeding. Suitable control means may be provided for gauging the extruders or their discharge rates and of the structured web(s) supplied in accordance with the invention.

In a preferred embodiment, at least one roll is arranged between the flat sheet die and the laminator for applying a pattern to the inside face of the web fed, preferably, as the latter is in a partly chilled state. Said one roll may, in particular, be a component of a printing unit by means of which the pattern to be inserted is applied as a color coating onto the inside face of the web. Furthermore, this roll may be provided with an embossed pattern so as to impart a given texture to the web's inside face. Expediently, such a roll is arranged at a predetermined distance to the flat sheet die in order to moderately chill the inside face of the web onto which the desired pattern is thus applied in a particularly reliable way.

A very favorable type of device according to the invention contains, downstream of the laminator, coating means for applying color patterns to an outside face of the sheet, followed by uncoating means for partially removing the color patterns again, especially by polishing. It will be seen that these means for coating and uncoating require but little design and constructional effort, whereas they enable the application of peculiar color patterns while warranting good bonding between said patterns and the webs which, having left the laminator, still carry some residual heat.

Further, at least one roll of the laminator is an embossing calender for applying an embossed pattern to the outside face of the multi-ply sheet, the color pattern being applied to the embossed outside face. If, e.g., by polishing the color patterns are partly removed, this abrasion occurs substantially at the raised portions of the web's outside structured face. By contrast, the color patterns applied generally remain in the sunk portions of the structured outside face, and it will be evident that in these sunk areas of the outside faces, there is little hazard of deterioration of the colored patterns existing there. Moreover, these sunk regions may be roughened teaseled for enhancing the permanent bond of the color patterns. At any rate, a multi-ply sheet thus manufactured features outside surfaces of particular appearance.

An important specialization of the device according to the invention provides that the flat sheet dies of the extruders are arranged in the immediate proximity of the set of rolls and/or of the roll nips of those rolls between which the webs and the structured web are fed. Therefore, the device is comparatively compact and the influence of ambient conditions is reduced to a minimum. Also, the accumulation of dirt or the cooling of the webs between the extruders and the set of rolls joining the latter is prevented. In addition, start-up of the device is relatively easy, the moreso since the webs are directly fed to the set of rolls by means of the extruders.

By an expedient embodiment, the extruders are arranged at one side each of the set of rolls. Design and construction of the device are thus far from complicated, as contrasted with expensive machine frames and foundations that were hitherto absolutely necessary for feeding the webs from one side only of the set of rolls. Now as, in accordance with the invention, one extruder is at one side and the other extruder at the other side of the set of rolls, it is possible to arrange the flat sheet dies or other introducing elements in the immediate proximity of the roll nips for the webs and the structured web, respectively. Furthermore, those dies are easily accessible for adjustment, demounting and mounting as well as maintenance. Again, this is an important advance over the prior art where the devices left little room for such purposes so that the work could be performed only with great effort and under laborious contortions.

In a preferred example of the manufacturing device, the extruders are arranged at one side each of a laminator that comprises at least three rolls. This is a well tried design that requires relatively small capital investment and operating cost. By arranging one extruder each, at each side of the laminator, the device is compact and space-saving. Attention is drawn to the fact that thus the device is of a simple design with a minimum of units and other components. Also, it is with comparatively small expenditures that the tuning, synchronizing and control of the laminators, the two extruders and the feeder for the structured web is achieved. Consequently, the device has a high service reliability and can be operated with ease which fact serves to reduce the labor needed.

Further, in accordance with the invention, the structured web and the one web are together introduced into one roll nip and the other web is introduced into another roll nip of the laminator. Handling and ease of operation of the device are thus considerably facilitated. Since into the first-named roll nip, only the one web and the structured web are introduced, start-up and adjustment present no problems, whereas the common introduction of two webs together with the structured web formerly resulted in material difficulties. According to the embodiment mentioned here, the other web is introduced into the second roll nip of the laminator only after the introduction of the one web along with the structured web. In this connection it will be remembered that the introduction of these webs into the laminator is normally performed at a reduced roll speed. After this preparatory work, the laminator, the two extruders and the take-off means for the structured web are synchronously run up to the nominal speed.

The joining process is further improved if the structured web is arranged to contact one laminator roll over a predetermined peripheral angular range thereof prior to entering into a roll nip and/or prior to bonding to the one web.

The invention relates, in particular, to multi-ply sheets as they are made by the method and/or by means of the device described hereinbefore, especially for use with a shower enclosure having at least one wall or door section comprising the multi-ply sheet of extrudable plastics material, and a frame made of sectional rails of a particular design.

Such a shower enclosure is described in the German Patent Application Publication No. (DE-OS) 2 912 126. This shower enclosure comprises a plurality of door elements that are shiftable horizontally in parallel planes. Basically, there are sliding doors provided which can be moved in a profile rail for either opening or closing the shower enclosure. Each door section includes a frame of profiled frame components and a panel framed thereby, the panel being of a light transmitting or transparent plastics material. The prior art also comprises shower enclosures having, in addition to the movable door sections, wall sections permanently secured to a building. Again, such permanently installed wall elements consist of a frame and a panel contained therein. The panels made of multi-ply sheet have found wide application for such shower enclosures, as they are largely moisture-proof and stable. On the other hand, such plastics panels have no particular appeal and shower enclosures using them may appear rather peculiar or conspicuous in a bathroom. For the reasons mentioned, it was heretofore impossible to employ other materials such as textiles. In addition, the sheet panels of wall or door sections conventionally had to have a uniform color throughout, since color coatings applied to a plastics material are prone to rapid deterioration.

It is, therefore, another object of the invention to provide, especially for use with shower enclosures, panels of multi-ply sheet material that is adapted to create a favorable overall appearance throughout the service life of the shower enclosures, protecting them, in a simple and fail-safe manner, against deterioration and soiling and enabling ease of cleaning.

A further object in this connection is to provide panels of multi-ply sheet material that will without difficulty lend themselves to insertion in wall or door sections, imparting to them desired optical effects, and will warrant proper operation under variegated circumstances and ambient conditions.

Another object of the invention is to provide an enclosure, in particular a shower enclosure, which incorporates the multi-ply sheet material as well as specially formed sectional rails as a frame for the enclosure, which will be described in greater detail later in this specification. In a multi-ply sheet of extrudable plastics material, in particular made by the method or by the means of the device described hereinabove, for use with a shower enclosure having at least one wall or door section comprising the sheet, the invention further provides the improvement wherein the sheet of the wall or door section consists of at least two outer plies between which at least one insert ply or a structured web is sandwiched, and wherein at least one outer ply is of a transparent plastics material.

Such a shower enclosure is distinguished by a simple and economical design providing protection, by means of the outer plies, to the structured web or insert pattern against any effects or influence from ambient conditions. Thus, an excellent appearance is achieved and maintained throughout the lifetime of the shower enclosure. Expediently, the two outer plies are made of a suitable plastics material and are shaped to completely include or embed the structured web or the insert pattern, respectively. Therefore, the latter may be made of any material desired, its properties being irrelevant with respect to operability. Since at least one outer ply is of a light transmitting plastics material, the structured web or insert pattern is visible to anyone viewing the panel or multi-ply sheet which, according to an embodiment of the invention, is incorporated in wall or door sections of a shower enclosure. This construction is distinguished by the advantages of conventional plastics panesl such as long service life, solidity, easy attendance, etc. In addition, the structured web or the insert pattern confers an excellent overall impression to the shower enclosure, the appearance being easily adapted to local requirements and personal desires.

According to one embodiment, the insert ply comprises a textile material. In particular, a curtain cloth of attractive design may be used. The shower enclosure having such wall or door sections will provide the appearance of a textile material or a curtain, but it will, due to the outer plastics plies, prevent any soiling or soaking.

In a preferred embodiment, the inner ply comprises a plastic foil. This permits cheap production and the use of a color coating, a color pattern or other textures. All of these will be visible through the transparent or light transmitting ply that protects them whatever factor of deterioration is involved. For instance, a wood pattern may be printed on the plastic foil without difficulty, making the shower enclosure appear as though manufactured of wood but maintaining the advantages of plastics panels.

Alternatively, the insert ply may be of wood veneer. Although this is quite sensitive against ambient conditions such as moisture, being situated between the two outer plies it will be protected safely thereagainst.

According to another preferred embodiment, the insert ply comprises a thin color coating. In particular, this color coating may be applied onto an outer ply, contributing to perfect bonding. The other outer ply will in this case serve to protect the color coating or color pattern against external influences.

By a further embodiment the two outer plies consist of a transparent plastics material. This will ensure that the central ply is fully visible from either side so that its structure and/or pattern is exhibited.

Advantageously, the inside faces of the outer plies intimately contact the insert ply and are solidly bonded thereto. It will be appreciated that such bonding may be restricted to spots as well. At any rate, however, it is warranted that the insert ply cannot deteriorate due to water or dirt penetrating thereto. Moreover, the solid bond will assure simple and reliable handling of the shower enclosure component during manufacture, assembly and use.

According to yet another embodiment of the invention, the insert ply comprises a wire cloth which, as will be realized, is a simple article of manufacture and adapted to reinforce the panel or multi-ply sheet.

In a special embodiment, the wire cloth may consist of aluminium and/or copper wires. Such materials lend themselves to non-hardening working and processing, e.g., by cutting and sawing of the multi-ply sheet which can be done with conventional tools.

In accordance with a further embodiment, the insert ply comprises a metal foil that is suitable for receiving, without difficulty, suitable patterns which may be applied by embossing, impressing, printing, etc. Again, the outer plies will serve to reliably prevent any deterioration, corrosion, or the like.

In order to permit simple and easy cleaning of the shower enclosure, yet another embodiment of the invention provides for the outer faces of the multi-ply sheet to be substantially smooth. It will be evident that dirt and foreign matter will not easily stick to such smooth outer faces. Furthermore, they may well be sealed with relatively little expenditure to any frame or frame portions including such outer faces so that the penetration of dirt, contamination or even bacteria or pathogenic agents is definitely precluded.

In addition to the multi-ply sheets for the enclosure, the invention is directed to an inexpensive sectional rail for the frame, which is of a design requiring only a relatively small overall height and/or volume for receiving a facing strip.

This is even more important as the facing strip is provided on a statically supporting part of the sectional rail. Sectional rail and facing strip are to be simple and inexpensive in structure and allow a quick and reliable mounting. As with the multi-ply sheets, contamination is still to be minimized.

The solution provided to this end is that a protruding portion of the rail has a springy arm extending toward a central plane of the rail for folding a connecting strip in a recess of a guide groove of the rails under a predeterminable biasing force, and that the connecting element and the facing strip have interengaging, springy locking elements. Due to its springy arm, the connecting strip is retained in the guide groove firmly and without play. Again, due to the springiness of the arm, a suitable bias force is produced corresponding to the respective requirements, to prevent the inserted facing strip from rattling or being displaced, even while observing all the tolerances. Be means of the springy, elastic locking elements, of the connecting strip and the facing strip, a reliable and play-free connection is also ensured. Within the scope of the invention, the connecting strip is advantageously made of an extrudible plastic, particularly non-rigid PVC, so that the manufacturing costs are very low. The insertion and mounting of the facing strip can be effected simply and very exactly since, initially, the connecting strip with its protruding portion is inserted into a recess, then the facing strip is pushed into the connecting strip in a simple way. It must be pointed out that the connecting strip can be inserted into the sectional rail already in the shop, and that upon setting up the sectional rail, and particularly, assembling the shower enclosure at the site, a facing strip can be inserted having the desired aspect.

Since the protruding portion with its springy arm, and the engaging elements represent different constructional parts, they may be dimensioned and designed independently of each other, without the necessity of making any concession. The size and springiness of the arm may easily be predetermined in accordance with the entire design of the sectional rail, while the engaging elements may be dimensioned with regard to a simple insertion, and even easy exchange and replacement, of the facing strip.

In a specific design the connecting strip comprises a central portion, preferably applying against the bottom of the guide groove, to which the elastically springy arm is joined through a lateral arcuate portion, with the arm applying to the inner surface of the recess. The central portion may advantageously be a narrow strip, or the like, and the arcuate portion and the arm secured thereto again do not require much material. The arm applies under a corresponding biasing stress against the inner surface of the recess and the connecting strip therefore also applies by its central portion immovably against the bottom of the sectional rail. In accordance with the invention, the arcuate portion is spaced from the side wall of the recess by a suitable distance, to ensure, under any conditions, the elastic mobility of the arm.

To be able to insert the facing strip simply and quickly, the engaging element of the facing strip is designed as a web with an enlarged end portion, extending inwardly, toward the bottom of the guide groove. In the opposite direction, the connecting strip is designed with an engaging element having an outwardly extending web with an extension partly engaging over the end portion. Both the facing strip and the connecting strip are simple and inexpensive products, and the end portion and opposite extension of the webs can easily be engaged with each other to occupy the desired position. The cross-section and size of the webs may be such as to both facilitate the insertion of the facing strip and to hold it reliably within the sectional rail. In an advantageous embodiment, the engaging element of the facing strip applies against the central portion of the connecting strip. A secure support is ensured in a simple way and denting and damaging of the facing strip are virtually out of the question, even under relatively strong forces from the outside.

In a particular embodiment, the arm of the connecting strip is applied by its end portion against the facing strip and, preferably, the engaging element thereof. This considerably facilitates the insertion of the connecting strip, since the springy arm can be made relatively compliant. If now the facing strip is inserted, the arm is pressed firmly into the recess. Evidently, the arm then becomes relatively very stiff.

To simplify the insertion of the facing strip into the sectional rail, the arm applies by its end portion against the side surface substantially parallel to the central plane of the engaging element of the facing strip. This reliably braces the springy arm against the engaging element, with no unusual forces being necessary for the insertion operation.

In a specific embodiment, the facing strip is a thin strip having an engaging element at either side. The facing strip can thus be manufactured inexpensively with relatively simple tools and little material, and its structure is symmetrical about the central plane.

It is of particular importance that the connecting strip can be introduced into the sectional rail in the direction of the longitudinal axis, and that the facing strip can be inserted into the sectional rail from the front face, perpendicularly to the longitudinal axis. The connecting strip is introduced at the shop, or factory, and is retained in the rail securely during the following working or handling, particularly during the assembly of a shower enclosure, and cannot get lost during transportation.

At the site, the sectional rails, or a structure made therefrom, may be set up or mounted initially without the facing strip. Damage to the facing strip is thereby safely prevented. Only after terminating the work on the structure proper, is the facing strip inserted in a simple way. Due to the inventive design of the engaging element, the facing strip may thus, if needed, be removed again and another facing strip may be inserted. The connecting strip remains permanently and firmly in the guide groove of the sectional rail.

Further features and advantages of the method, device, multi-ply sheet and the shower enclosure according to the invention will be apparent from the disclosure of preferred embodiments given below with reference to the drawings.

DESCRIPTION OF PREFERRED EMBODIMENTS

Figure 1:
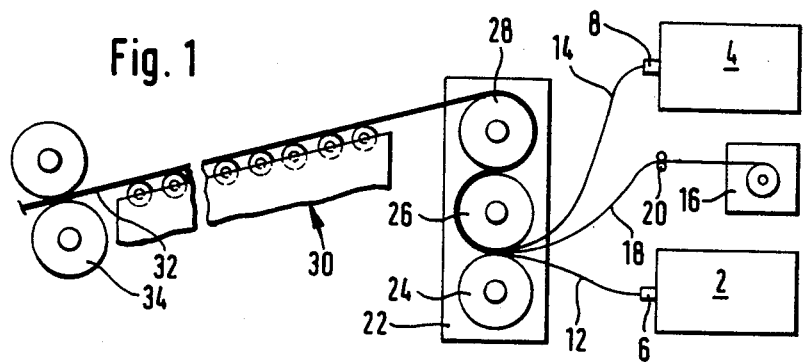
FIG. 1 is a schematic diagram of a device comprising two extruders between which a preformed web or a structured web is fed to a common laminator.

In the schematic diagram of FIG. 1, two extruders 2, 4 are shown which include flat sheet dies 6 and 8. These latter are parallel to each other and extend over a given width of, say, 2 m in a direction vertical to the drawing plane. Through these dies 6,8, the extruders 2,4, supply in a conventional manner webs 12,14 of plastics. An unwinder 16 is provided for supplying a further structured web 18. In particular, the structured webs is of textile material such as curtain cloth. Alternatively, the structured web may be a plastic foil carrying a texture, a printed pattern or a color pattern, as the case may be. It is possible to prefabricate such structured webs and to insert them, by way of reels, into the unwinder 16. The structured web 18 is taken off by means of a feeder 20.

Downstream of the two extruders 2, 4 there is a common laminator 22. As a rule, it contains three rolls 24, 26, 28 for smoothing and, i.e. being chill rolls, also for chilling, a plastics web introduced. In accordance with the invention, the webs 12, 14 supplied from the flat sheet dies 6, 8 are fed together with the structured web 18 to the laminator 22, with the structured web 18 being sandwiched between the two outer webs 12 and 14. In this way, perfect bonding of the two webs 12, 14 including the structured web 18 is achieved. A roller conveyor 30 is arranged downstream of the laminator 22 for finally cooling down a multi-ply sheet 32 thus manufactured.

In addition, take-off rolls 34 are provided for some stretching of the sheet 32 in order to prevent its slacking or corrugating. The take-off rolls 34 are followed by further units and plants such as trimming tools, stacks, etc., which are not shown as they do not directly contribute to the invention.

Attention is drawn to the fact that a multi-ply sheet or panel 32 comprises three plies corresponding to web 12, structured web 18 and web 14. Preferably, at least one of the webs is of a transparent or light transmitting plastics material so that the inner structured web will be visible from outside. For instance, if the structured web is a curtain cloth having a woven or knitted pattern, the latter will be directly perceptible. As the thickness of the webs 12, 14 corresponds to the setting of the flat sheet dies 6,8, the structured web 18 will always be in a predetermined region within the multi-ply sheet 32 produced. Since the webs 12 and 24 with the structured web 18 sandwiched therebetween are fed into the laminator 22, any irregularity of the assembled panel or multi-ply sheet 32 is prevented.

Figure 2:
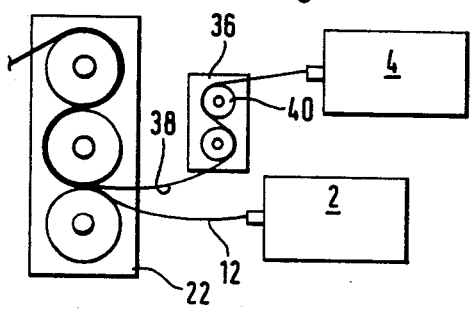
FIG. 2 is a view of a device similar to part of FIG. 1 but showing, in addition, downstream means for applying a pattern to the web's inside surface.

The diagram of FIG. 2 shows an embodiment including a coater 36 by means of which a pattern is first applied to the inside surface 38 of web 14. Preferably, the coater 36 is a printing unit for applying a color coat or color coatings onto the inside surface 38 of web 14 in a conventional manner. Tis involves the use of a print roll 40 schematically indicated, whereas color or ink feeders, distributors, etc., are not shown in the drawings. Expediently, the coater 36 is arranged at a distance to extruder 4 so that the inside surface 38 will be moderately chilled when the color coats or patterns are applied.

Figure 3:
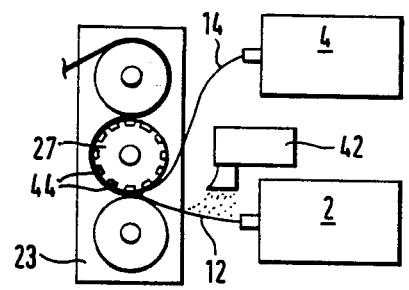
FIG. 3 is a view of a device similar to part of FIG. 1 but showing, in addition, means for applying preformed particles onto a web's inside surface in order to obtain a pattern thereon.

The embodiment according to FIG. 3 features a distributor 42 for spreading particles onto web 12 into which they may be rolled by means of a laminator 23. The particles may be preformed; e.g., small plastics balls, rods or other shaped parts, which may also incorporate dye substances. If these particles are spread and fed together with the plastics web 12,14 to the laminator 23, corresponding patterns are formed. Alternatively or additionally, the distributor 42 may be used to spread or spray dye particles onto web 12 for generating or modifying a pattern. Further, as indicated in FIG. 3, the central roll 27 of laminator 23 may have an embossed periphery or profile 44. Such a profile permits applying a pattern to the outer face of the final multi-ply sheet 32 as well. Combined with an inner structured web 18 introduced by the method according to the invention, such an outer pattern will create special optical effects.

Figure 4:
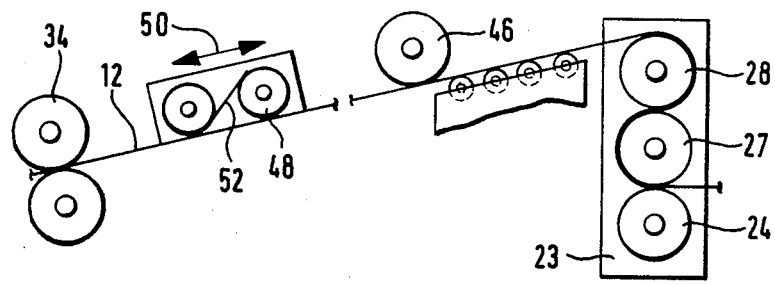
FIG. 4 is a schematic diagram of a device including coating and partial uncoating means for color patterns.

Another embodiment is shown in FIG. 4 wherein on a roller conveyor, coating means 46 are provided for applying color patterns onto the outer face of web 12. The coating means 46 may be a print roll to which a color or ink may be in a conventional way (not presented). Further, uncoating means 48 are arranged downstream of the coating means 46 for at least partially removing again the color patterns applied previously. The uncoating or abrasion means are adapted to reciprocate, particularly in the direction of double arrow 50, at the lower or bottom side of web 12. This reciprocating motion is performed at a relatively high speed and under a certain contact pressure. Color or dye particles thus abraded may be collected by means of a belt 52 in the interior of uncoating means 48. At timed intervals, the belt 52 is moved on so that fresh portions of the belt 52 will be available for collection. It is emphasized that the application of color patterns onto the outer face of a panel as described may also be performed with a single-ply material. If the color patterns are applied to a structured or texture outer face, this will lead to particularly favorable results since the color pattern is substantially retained in the sunk regions of the outer face, whereas the color or dye particles are largely removed from the raised portions of the outer face by the abrasion or uncoating means.

Figure 5:
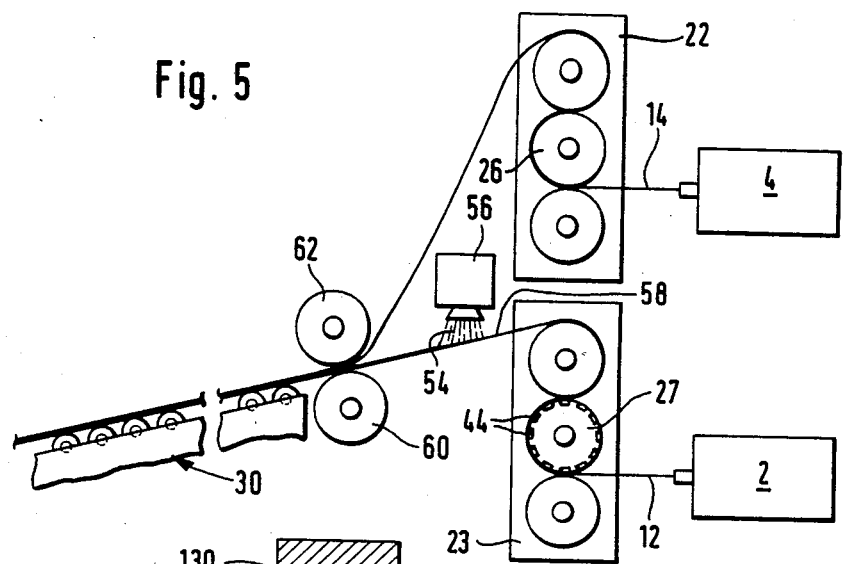
FIG. 5 is a schematic diagram of a device which permits bonding of webs by means of an adhesive.

From the schematic diagram of FIG. 5, a preferred embodiment will be seen in which laminators 23 and 22, respectively, are arranged downstream of the extruders 2 and 4, respectively. Laminator 23 comprises a central roll 27 with a peripheral profile 44. It will be evident that web 12 issuing from laminator 23 has a structured surface 58. By contrast, laminator 22 includes three smooth rolls 26 so that web 14 issuing therefrom also has smooth surfaces. Now the two webs 12 and 14 are jointly fed to a set of rolls 60, 62. Upstream of these, however, there is an applicator 56 by means of which an adhesive 54 may be spread or sprayed onto the structured surface 58 of web 12. The clearance between the rolls 60 and 62 is selected such that the adhesive 54 introduced therebetween will have a predetermined optimum thickness. At the same time, rolls 60, 62 serve to provide the pressing force for achieving a reliable bonding of webs 12 and 14. The distance of the set of rolls 60, 62 to the laminators 22, 23 is dimensioned to warrant that at least the surfaces of webs 12, 14 are moderately chilled in order to exclude a substantial change or modifications of the structured surface 58 of web 12. It will be seen that the webs after passing through the set of rolls 60, 62 are joined to each other to form a multi-ply sheet with substantially smooth outer faces. The structured surface 58 is within the final multi-ply sheet which, in spite of its smooth outer faces, has the same appearance as a conventional sheet with a structured outer face. Preferably, the adhesive 54 includes suitable dye substances to obtain color effects, if such are desired.

Further, it will be evident that the means and measures elucidated above with reference to FIG. 4 may be suitably combined with the device according to FIG. 5. Similar to the manner elucidated above, coating means 46 and uncoating means 48 may be arranged between a laminator 23 and a set of rolls 60, 62. Thus, color patterns will be applied to the structured surface 58 of web 12, and only in the raised portions of the structured surface 58 will the uncoating means 48 be operative. A multi-ply sheet thus manufactured is distinguished by special optical effects and a peculiar appearance. The method and the device for manufacturing it do not, however, require particular expenditures.

Reference is made to the fact that within the scope of the invention, the webs may be supplied from the extruders via means other than elucidated above. Thus, it is possible to arrange downstream of the extruders—i.e., without any flat sheet dies—calenders or other sets of rolls which may even replace the laminators. However, all the embodiments of the invention are characterized by sandwiching a structured web, a pattern or the like in between the webs supplied and the assembled webs are subsequently joined or bonded to each other by suitable roll means.

Figure 6:
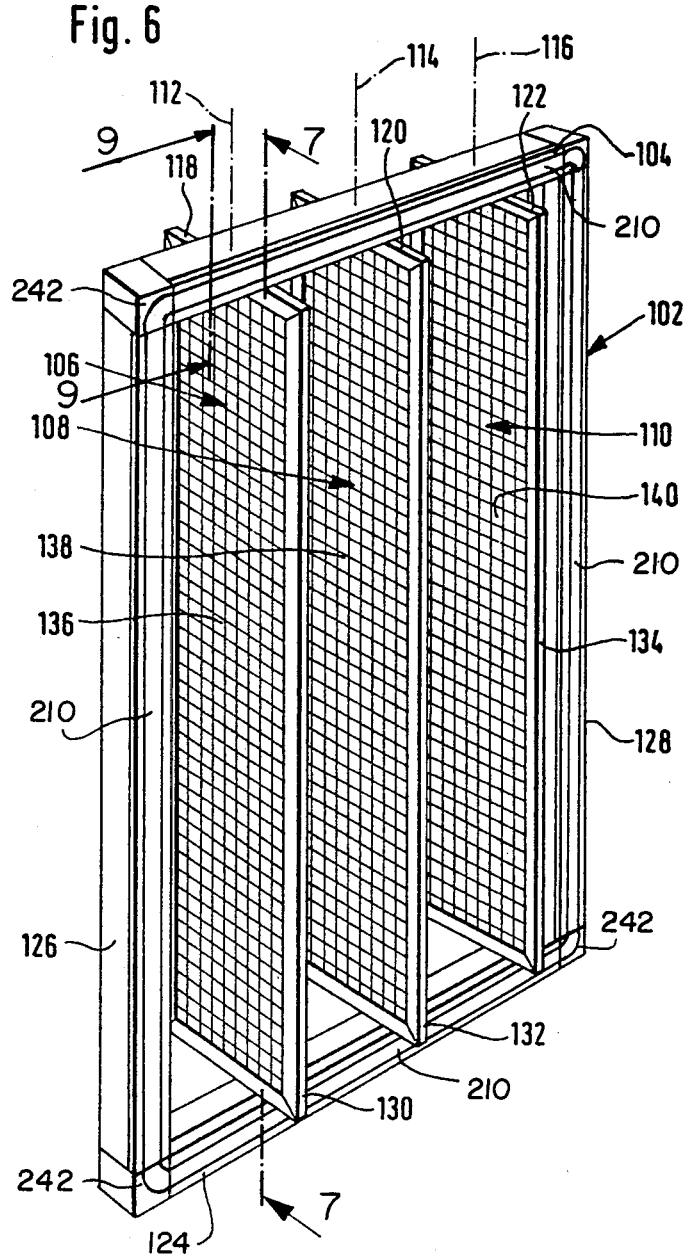
FIG. 6 is a perspective view of a shower enclosure frame according to the inventions having door sections with panels of extrudable plastics material that are pivotable around vertical axes on a frame of sectional rails.

The perspective view of FIG. 6 shows the example of a shower enclosure having a profile frame 102 with an upper profile or sectional rail 104 in which three door sections 106, 108, 110 may be shifted. These sliding door sections 106, 108, 110 are shown here in a pivoted position, the vertical pivot axes being designated by 112, 114, 116. Normally, the door sections 106, 108, 110 are at a right angle to the position shown so that the upper front edges 118, 120, 122 are essentially parallel to the upper profile rail 104. By suitable guiding means (not shown), the door sections 106, 108, 110 may be slid along upper profile rail 104 for providing an entrance to the shower enclosure.

The profile frame 102 may rest with its lower profile or sectional rail on top of the brim of a shower or bathtub, and lateral profile or sectional rails 126, 128 serve to secure the profile frame 102 by suitable means (not shown) to the walls of a building. It is possible to attach one of the lateral profile rails 126, 128 or both with a wall component (not shown) arranged at a right angle to the lateral profile rails 126, 128.

The door sections 106, 108, 110 comprise inset frames 130, 132, 134 containing panels 136, 138, 140. As will be explained below, these panels 136, 138, 140 consist of a plurality of plies with an inner or insert ply 146 being visible through transparent outer plies 142, 144.

Figure 7:
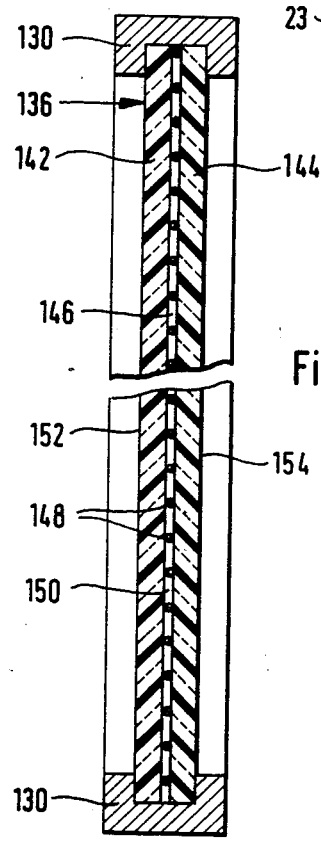
FIG. 7 is a vertical longitudinal section view of a door section taken along line 7—7 in FIG. 6.

FIG. 7 shows a vertical sectional view along the line 7—7 of FIG. 6 representing door section 106. It will be realized that panel 136 comprises two outer plies 142, 144 of a light transmitting or transparent plastics material. An insert ply 146 is sandwiched between the outer plies 142, 144. In the embodiment shown, this insert ply 146 is a textile material, viz. a curtain cloth indicated in FIG. 7 to be a fabric of trellis or filament structure. For the sake of clarity the cloth is indicated at a larger scale, the woof threads being designated by 148 and the warp threads by 150. The outer plies 142, 144 and the insert ply 146 are solidly bonded to each other due to the warm treatment, the use of rolls or the like in the manufacture of panel 136. In this process, the insert ply 146; i.e., the curtain cloth, is at least partially penetrated by the outer ply plastics that is relatively soft and shapable at this stage. Since the outer plies 142, 144 are of a light transmitting or transparent plastics material, the pattern of the insert ply 146; e.g., the curtain cloth design, is fully visible from outside. On the other hand, this curtain cloth is protected by the plastics plies 142, 144 against ambient influences, in particular against penetration of moisture or accumulation of dirt. Moreover, it is important to note that the outer faces 152, 154 of panel 136 are substantially smooth. Therefore, inset frame 130 may be directly and tightly joined to the outer faces 152, 154. For additional safety against the penetration of dirt and/or moisture between inset frame 130 and panel 136, it is possible to insert suitable seals that will definitely exclude any contamination or the penetration of germs.

As an alternative to the curtain cloth schematically indicated in FIG. 7, the insert ply 146 may also consist of materials. Thus, the insert ply 146 may comprise a plastic foil suitably provided with a color pattern. Also, insert ply 146 may be a color coat applied to one of the outer plies 142, 144. A plurality of outer plies and of insert plies may also be provided within the scope of the invention. For example, where a first insert ply of a textile material or cloth is used, a color coat or several color coats may be applied to the inside(s) of the outer plies 142, 144.

Yet other alternatives include insert plies 146 comprising a wire cloth that will most favorably increase the stability of the panel and thus of the entire shower enclosure. Expediently, the material of such a wire cloth may be aluminium or copper which lend themselves to relatively easy working and will permit cutting or sawing the panels to the dimensions required without the use of special tools. Furthermore, the insert ply may be a metal foil provided with desired patterns that may, in particular, be embossed. By means of the outer plies, such a metal foil, too, will be excellently protected against corrosion, deterioration or soiling.

Figure 8:
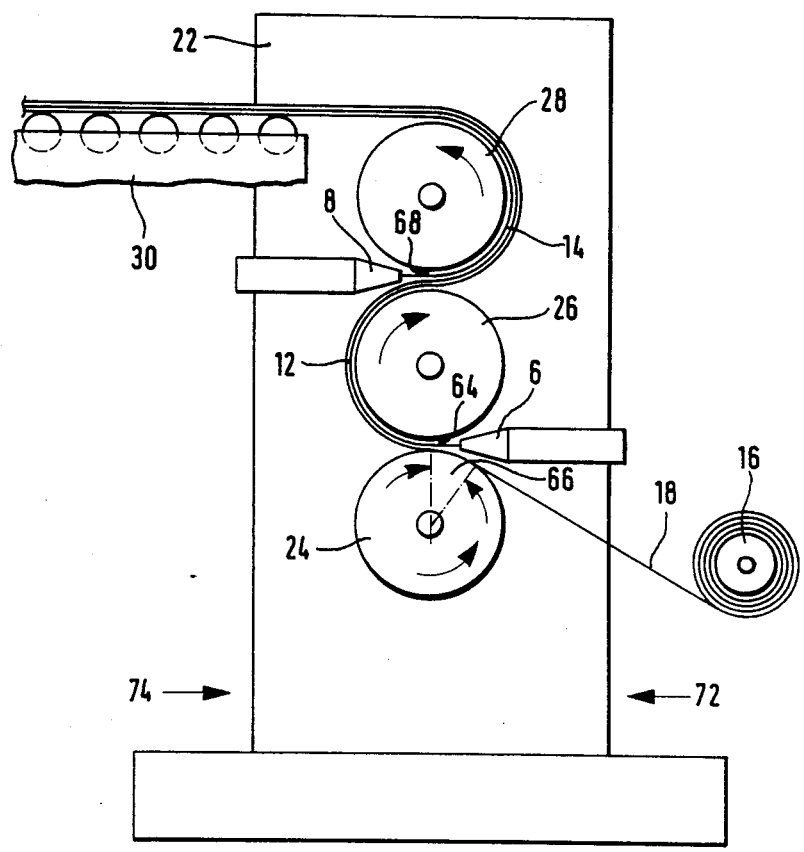
FIG. 8 is a schematic elevation of a device including a laminator to which one extruder each is associated at either side.

The schematic elevation of FIG. 8 shows a particularly important embodiment of the device according to the invention, with the set of rolls being a laminator 22 having three rolls 24, 26, 28. The flat sheet dies 6, 8 of the extruders (not shown) are partly indicated. It will be seen that the associated extruders are arranged at one side each 72 and 74, respectively, of laminator 22. The flat sheet dies 6, 8 are in the immediate proximity of the roll nips 64 and 68, respectively, so that the two webs 12, 14 may be directly fed into these roll nips of the laminator.

To the first roll nip 64, a structured web 18 is fed together with web 12. It is to be emphasized that structured web 18 as supplied from unwinder 16 contracts the lower roll 24 over a predetermined peripheral angular range 66 prior to entering the roll nip 64. This serves to reliably orient the structured web 18 as it enters the roll nip 64 so that plaits, wrinkles, etc., will be prevented and cannot occur in the final multi-ply sheet.

Further, it will be seen that roll chill 26; i.e., being unheated, or wrapped by web 12 as well as structured web 18 over an arc of 180 degrees, this bringing about some chilling of web 12 so that the structured web 18 is present thereon. Next, the other web 14—which is still relatively warm at this stage—is introduced into the roll nip 68. However, owing to the presetting of structured web 18 on web 12 in accordance with the invention, undue penetration or deformation of web 14 is reliably prevented.

A further advantage of the device according to this embodiment is its reduced overall height. The extruders mentioned need not be stacked vertically on top of each other. Rather, they are arranged at either side 72 and 74, respectively, of the laminator rolls 24, 26, 28, as is evident in FIG. 8 from the position of flat sheet dies 6 and 8, respectively. These latter are, moreover, directly accessible for operation, adjustment and maintenance; e.g., die 6 from above and die 8 from below, so that the operator's work is greatly facilitated.

Figure 9:
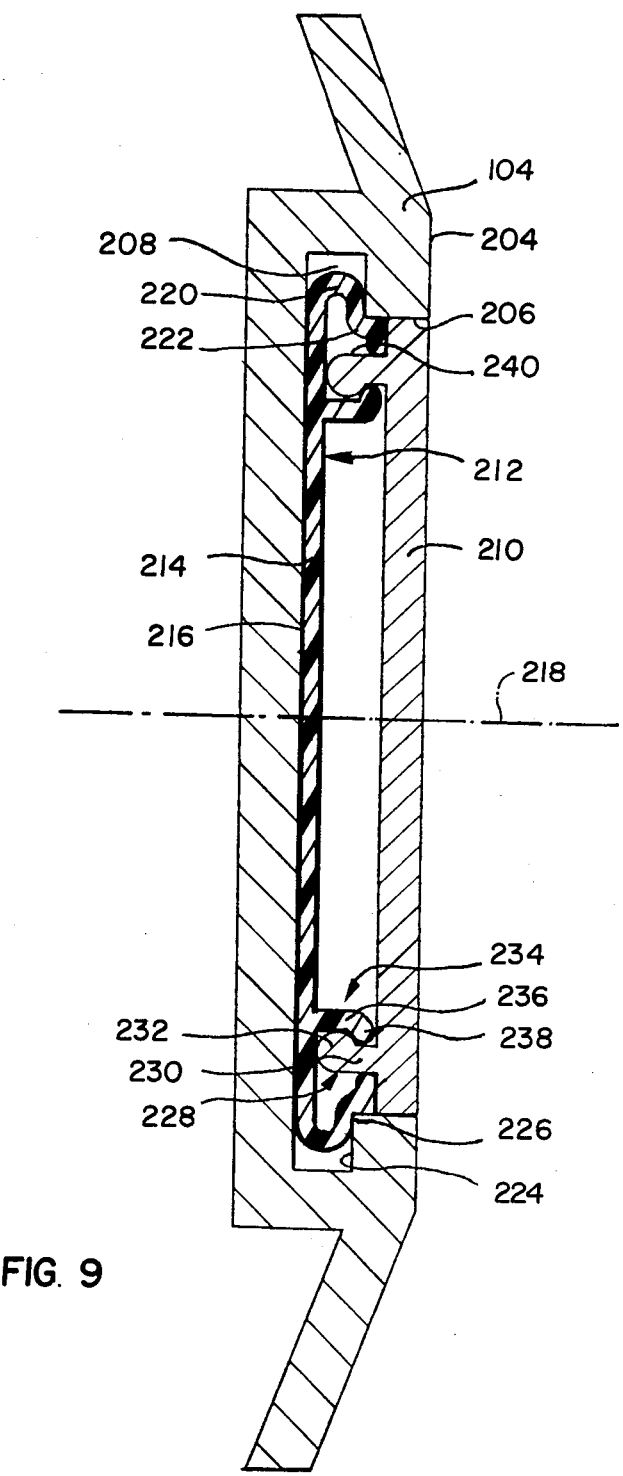
FIG. 9 is a vertical sectional view of a rail taken along line 9—9 in FIG. 6.

Referring now to FIG. 9 and in conjunction with FIG. 6, sectional rail 104, is illustrated by a sectional view taken along line 9—9 of FIG. 6.

Portions of the sectional rail which are irrelevant to the intention are not shown, such as the other parts thereof which form frame 102. Sectional rail 104 is provided on its outer surface 204 with a recessed guide groove 206 having a recess 208 in either of its side walls. The shown guide groove 206 has thus an/about T shaped cross-section; however, other cross-sections may also be provided, such as a dovetail section. Flush with outer surface 204, a facing strip 210 is inserted in guide groove 206. Without departing from the scope of the invention, the surface of facing strip 10 may also be arranged differently and have a different outer surface shape.

Within guide groove 206, a connection strip 212 is provided, applying, by its central portion 214, against the bottom surface 216 of guide groove 206. Facing strip 210, guide groove 206, and also connecting strip 212 extend symmetrically relative to a central plane 218 of the rail. Connecting strip 212 has two laterally protruding portions, each comprising an arcuate portion 220 and an arm 222. Arm 222 extends inwardly toward central plane 218 and applies at least partly against the inside surface 224 of recess 208. Connecting strip 212 is made of an elastic springy material, preferably non-rigid PVC, having a Shore-hardness corresponding to the given conditions. Because of the springy arms 222, connecting strip 212 is engaged in guide groove 206 without play and arm 222 applies against the longitudinal edge 226 of sectional rail 104 and/or the inside surface 224 of recess 208 under a biasing force. Thus, in accordance with the invention, the connecting strip 212 is positioned and fixed in a definite manner.

Facing strip 210 comprises in either of its two side zones, an engaging element 228 having a web 230 which extends inwardly, toward bottom 216 and has an enlarged end portion 232. End portion 232 applies against connecting strip 212, so that a secured support is obtained. The enlargement of end portion 232 is provided at the side of web 230 facing central plane 218. Connecting strip 212 is provided with associated engaging elements 234 having each an outwardly extending web 236 and an extension 238. Extension 238 partly engages over end portion 232. At least engaging element 234 of connecting strip 212 is springy; however, the same property may be provided for engaging element 228, in addition or instead, without departing from the scope of the invention. Due to the springiness of the engaging elements, facing strip 210 becomes interlocked with connecting strip 212 firmly and without play. Altogether, due to the inventive design, manufacturing tolerances and/or inaccuracies are compensated for to an extent such that facing strip 210 is firmly retained in sectional rail 104.

Connecting strip 212 is introduced into sectional rail 104 in the direction of the longitudinal axis, i.e., perpendicularly to the drawing plane. No unintentional disengagement during the further working or handling of the sectional rail is possible. Facing strip 210 may subsequently be inserted into sectional rail 104 on the outer surface 204 thereof. Engaging element 228 of facing strip 210 has a side face 240 which is substantially parallel to central plane 218. The end portion of arm 222 applies against this face 240. As long as facing strip 210 is not yet inserted, arm 222 is free, and even though springy, it is relatively compliant. Its insertion into guide groove 206 is thereby considerably facilitated, in accordance with the invention. Then, upon inserting facing strip 210 into guide groove 206 in the explained manner, side face 240 of engaging element 228 presses arm 222 against longitudinal edge 226 and/or inside surface 224 of recess 208. This provides for a firm anchoring and backing.

In accordance with the invention, with a facing strip inserted, an increased rigidity and strong biasing force are obtained.

In accordance with the invention, not only sectional or profile rail 104, but also side rails 126,128 and bottom rail 125 can be formed in the same way. The frames of multi-ply sheets 136, 138, 140 may also be structured in the same manner, if desired.

As shown in FIG. 6, four sectional rails are connected to each other by corner sections 242 that are formed similarly to the rails as shown in FIG. 9, but are curved.

While preferred embodiment have been illustrated and elucidated hereinabove, it should be understood that numerous variations and modifications will be apparent to one skilled in the art without departing from the principles of the invention which, therefore, is not to be construed as being limited to the specific forms described.

What is claimed is:

1. Partition for forming a shower enclosure comprising:

a main frame having an opening for receiving a door element, a door element comprising a perimetric inset frame having an exterior marginal portion operatively received in the opening of the main frame, and an interior marginal portion which defines panel edge and outer layer face receiving, contacting and joining means, and a unitary multi-ply panel having a perimetric panel edge and comprising two outer layers composed of transparent plastic material and an inner visual insert layer provided and fixed between the two outer layers so that at least one of structure and color of the inner layer is visible through the outer layers of the panel, the inner layer being tightly embedded between the outer layers and in coextensive surface contact therewith and being sealed against dirt and moisture penetration with respect to the exterior of the panel, each of the three layers of the panel being composed of at least one ply and the outer layers being provided with substantially smooth outer faces at least along the perimetric panel edge, the panel being mounted perimetrically in the interior marginal portion of the door element with the panel edge and and the adjacent portions of the smooth outer faces of the outer layers being received in the receiving, contacting and joining means and directly and tightly operatively joined thereto along the adjacent coextensive portions thereof for sealing the panel edge against dirt and moisture penetration thereat.

2. Partition of claim 1, wherein the outer layers are composed of heat shapable plastic material and the inner layer is composed of plastic penetratable textile material sandwiched between and solidly bonded to the two outer layers and at least partially penetrated by the transparent plastic of the outer layers.

3. Partition of claim 2, wherein the inner layer is composed of wire cloth for increasing the structural stability of the unitary panel.

4. Partition of claim 1, wherein the inner layer comprises a textile fabric.

5. Partition of claim 1, wherein the inner layer comprises a foil of plastic.

6. Partition of claim 1, wherein the inner layer is made of wood veneer.

7. Partition of claim 1, wherein the inner layer comprises wire netting.

8. Partition of claim 1, wherein the inner layer comprises metal foil.

9. Partition for forming an enclosure comprising:

a frame formed of a plurality of sectional rails connected to each other, each rail having an outer exposed surface and a longitudinal guide groove communicating with the outer surface and having a recess disposed along each corresponding longitudinal side of the groove and extending partly behind the outer surface to form a pair of opposed laterally outwardly extending undercuts beneath the outer surface, an elastic connecting strip seated in the groove and having a pair of opposed laterally outwardly projecting elastic portions correspondingly extending into and engaged with the pair of recess undercuts and which projecting elastic portions are provided with medially facing surface portions, a facing strip engaged in the groove and engaged with the connecting strip for holding the facing strip in the groove, a pair of opposed first interlocking engaging elements defined on the connecting strip and arranged in corresponding laterally inwardly spaced relation to the medially facing surface portions of the projecting elastic portions and extending outwardly in the direction of the outer surface of the rail, and a pair of opposed second interlocking engaging elements defined on the facing strip and correspondingly extending inwardly in the direction of the connecting strip and toward and in engagement with the pair of first interlocking engaging elements and having a pair of laterally outwardly facing surface portions correspondingly in urging engagement with the medially facing surface portions of the projecting elastic portions under a predetermined biasing force, such that the facing strip is held in substantially play free condition in the groove against outward movement by the engagement of the second interlocking elements with the first interlocking elements and against lateral movement by the urging engagement of the laterally outwardly facing surface portions of the second interlocking elements with the adjacent interlocking elements with the adjacent medially facing surface portion of the projecting elastic portions of the conecting strip.

10. Partition of claim 9, wherein the pair of laterally outwardly projecting portions of the connecting strip comprise elastic springy seating portions correspondingly arranged in engagement with the recess undercuts and also with the adjacent portions of the longitudinal sides of the groove and resiliently held in the recess undercuts and against the sides of the groove under said predetermined biasing force.

11. Partition of claim 10, wherein the groove has a bottom surface, the connecting strip has a central portion engaged against the bottom surface, and the facing strip has an outer surface which is substantially flush with the outer surface of the rail.

12. Partition of claim 10, wherein the rail has a central plane lying substantially perpendicular to at least a portion of the outer surface thereof, and the facing strip has at least one side surface extending substantially parallel to the central plane of the rail and engaged against a portion of the groove.

13. Partition for forming a shower enclosure comprising:

a main frame having an opening for receiving a door element, and formed of a plurality of sectional rails connected to each other, each rail having an outer exposed surface and a longitudinal guide groove communicating with the outer surface and having a recess disposed along each corresponding longitudinal side of the groove and extending partly behind the outer surface to form a pair of opposed laterally outwardly extending undercuts beneath the outer surface, an elastic connecting strip seated in the groove and having a pair of opposed laterally outwardly projecting elastic portions correspondingly extending into and engaged with the pair of recess undercuts and which projecting elastic portions are provided with medially facing surface portions, a facing strip engaged in the groove and engaged with the connecting strip for holding the facing strip in the groove, a pair of opposed first interlocking engaging elements defined on the connecting strip and arranged in corresponding laterally inwardly spaced relation to the medially facing surface portions of the projecting elastic portions and extending outwardly in the direction of the outer surface of the rail, and a pair of opposed second interlocking engaging elements defined on the facing strip and correspondingly extending inwardly in the direction of the connecting strip and toward and in engagement with the pair of first interlocking engaging elements and having a pair of laterally outwardly facing surface portions correspondingly in urging engagement with the medially facing surface portions of the projecting elastic portions under a predetermined biasing force, such that the facing strip is held in substantially play free condition in the groove against outward movement by the engagement of the second interlocking elements with the first interlocking elements and against lateral movement by the urging engagement of the laterally outwardly facing surface portions of the second interlocking elements with the adjacent medially facing surface portions of the projecting elastic portions of the connecting strip;

a door element comprising a perimetric inset frame having an exterior marginal portion operatively received in the opening of the main frame, and an interior marginal portion which defines panel edge and outer layer face receiving, contacting and joining means; and a unitary multi-ply panel having a perimetric panel edge and comprising two outer layers composed of transparent plastic material and an inner visual insert layer provided and fixed between the two outer layers so that at least one of structure and color of the inner layer is visible through the outer layers of the panel, the inner layer being tightly embedded between the outer layers and in coextensive surface contact therewith and being sealed against dirt and moisture penetration with respect to the exterior of the panel, each of the three layers of the panel being composed of at least one ply and the outer layers being provided with substantially smooth outer faces at least along the perimetric panel edge, the panel being mounted perimetrically in the interior marginal portion of the door element with the panel edge and the adjacent portions of the smooth outer faces of the outer layers being received in the receiving, contacting and joining means and directly and tightly operatively joined thereto along the adjacent coextentive portions thereof for sealing the panel edge against dirt and moisture penetration thereat.

* * * * *